United States Patent [19]
Brown et al.

[11] Patent Number: 5,266,979
[45] Date of Patent: Nov. 30, 1993

[54] FILM GATE FOR CONTINUOUS MOTION TELECINE

[75] Inventors: Brian K. Brown, Grayson; Walter K. Chambliss, Atlanta, both of Ga.

[73] Assignee: Steadi-Film Corporation, Atlanta, Ga.

[21] Appl. No.: 865,896

[22] Filed: Apr. 9, 1992

[51] Int. Cl.$^5$ .............................................. G03B 1/48
[52] U.S. Cl. .................................. 352/224; 352/187; 226/87
[58] Field of Search ............... 352/221, 223, 224, 187, 352/188, 189; 226/87

[56] References Cited

U.S. PATENT DOCUMENTS

| | | | |
|---|---|---|---|
| 2,418,943 | 4/1947 | Jones | 352/224 |
| 2,425,217 | 8/1947 | Wienke | 352/224 |
| 2,522,255 | 5/1951 | Capstaff | 226/87 |
| 3,051,955 | 8/1962 | Pfleger et al. | 352/221 |
| 3,271,099 | 9/1966 | Debrie | 352/224 |
| 3,447,866 | 6/1969 | Heisler | 352/224 |
| 3,720,461 | 3/1973 | Reinsch et al. | 352/224 |
| 4,054,912 | 10/1977 | Millward et al. | 358/216 |
| 4,104,680 | 8/1978 | Holland | 358/132 |
| 4,149,191 | 4/1979 | Longchamp | 358/214 |
| 4,184,177 | 1/1980 | Millward | 358/214 |
| 4,205,337 | 5/1980 | Millward | 358/54 |
| 4,524,392 | 6/1985 | Poetsch | 358/214 |
| 4,823,204 | 4/1989 | Holland | 358/347 |

FOREIGN PATENT DOCUMENTS

| | | |
|---|---|---|
| WO88/01822 | 3/1988 | PCT Int'l Appl. |
| 4686 | of 1896 | United Kingdom ............ 352/189 |
| 1519398 | 7/1978 | United Kingdom |

*Primary Examiner*—Monroe H. Hayes
*Attorney, Agent, or Firm*—Jones & Askew

[57] ABSTRACT

An improved film gate for a continuous motion or real-time motion picture telecine. A housing supports and transports a film in continuous motion past a frame aperture. A precision milled entry guide roller receives the film from a feed spool, edge-stabilizes the film, and directs the film to a precision milled first entry sprocket. The entry sprocket is positioned prior to the frame aperture, pin registers the film, and directs the film across the frame aperture. A precision milled exit sprocket positioned subsequent to the frame aperture receives the film after it passes across the frame aperture and pin registers the film. A precision milled exit guide roller receives the film from the exit sprocket, edge stabilizes the film, and guides the film to a drive capstan and take up reel. The precision sprockets and rollers serve as film stabilizing means. A floating guide means positioned at the frame aperture provides additional edge stabilization of the film as it is guided past the frame aperture. Film jitter and weave are mechanically removed to less than about 20 nanoseconds without the use of complex expensive electronics.

30 Claims, 6 Drawing Sheets

FILM GATE FOR CONTINUOUS MOTION TELECINE

TECHNICAL FIELD

The present invention relates generally to apparatus for transferring motion picture film to video signals utilizing a telecine, and more particularly relates to an improved film gate for substantially reducing film weave or jitter in a "real-time" or continuous motion telecine, utilizing precision milled film guide rollers, sprockets, and frame aperture guides on the film gate.

Background of the Invention

A "telecine" is an apparatus utilized to transfer a motion picture film, for example a negative film shot in a motion picture camera, to a video signal format for storage or broadcast. Telecines are employed by motion picture and television production and post-production facilities to create video tapes of movies, commercials, news clips, and the like.

In a typical telecine, a source of light such as a flying spot scanner or a laser beam scans the film, or a light bulb projects the image onto a light detecting array, frame by frame, in a line-by-line or raster scan fashion. The light from the light source is transmitted through the film in a "film gate" on the telecine, and received by a light detector positioned to receive light transmitted through the film. A film gate includes an aperture ("frame aperture") for passing light from the light source to the telecine light detector and supports the film as it is scanned. The transmitted light is then converted into electrical signals, converted into an appropriate video signal format such as NTSC or PAL, and stored on a video tape or other storage device.

A flying spot telecine is an apparatus in which consecutive frames in a cinema or movie film are optically scanned in a raster fashion by a light beam of small cross-section (called a "flying spot"), wherein the picture information is thereby modulated on the light beam and converted by one or more opto-electronic detectors into electrical video signals. From the electrical video signals, a television signal is ultimately derived from scanning respective consecutive film frames.

There are two primary types of telecines—(1) intermittent or "start/stop", and (2) real-time or continuous motion. In the intermittent or "start/stop" type telecine, each frame of the film is located or "registered" at the frame aperture and held motionless during the scanning process. In the real-time or continuous motion telecine, the film is moved continuously with a film drive to move the film through the machine during the scanning process.

A particular difficulty encountered in telecine devices is the maintenance of the image on the film in reference to a stable image reference. The problem is particularly pronounced when images from different sources are superimposed, for example, when a computer-generated title or other graphics are superimposed against a scene generated by a motion picture film. If the image on the film is not stable relative to the superimposed graphics such as a title, the title may be seen to weave or jitter in relationship to the background. The jitter or weave problem derives from the fact that the positional reference for the film and for the overlaid graphics are not the same. When a film is originally shot in a camera, the image is mechanically registered on a particular film frame relative to the sprocket holes in the film. The times of a sprocket in the camera engage the sprocket holes in the film to register the film relative to the camera's optics. Such devices, including cameras, are considered mechanically or machine pin registered.

When a film from a motion picture camera is then to be transferred to video in a telecine, the film may not necessarily be machine pin registered but drawn through the machine by a continuous motion film drive. Typically, a drive capstan pulls the film through the film gate. In some continuous motion telecines, the film is edge-guided during the transfer. Film weave or jitter may be introduced as the edge of the film varies relative to the position of the sprocket hole. It is known that film edges tend to vary in distance from the sprocket holes due to manufacturing imperfections and tolerances in the film.

Various approaches have been employed to minimize film weave in film-to-tape transfers. One approach involves use of a single mechanical sprocket drive for moving the film through the telecine. This method introduces small but pronounced speed changes as the sprocket tines enter the sprocket holes, and therefore introduces another source of jitter. Moreover, mechanical sprocket drives are not favored because of the wear and tear on the film.

Other mechanical solutions involve mechanical pin registration with the start/stop devices discussed above. In this approach, the film sprocket holes are lowered, frame by frame, onto stationary register pins with a stepping motor controlled by an auxiliary computer. The film is held steady by pins during the transfer, and then a gate attachment is released to allow the film to advance. Such devices are complicated mechanically, limited in speed, and also produce significant wear and tear on the film because of repeated acceleration and deceleration of the film.

Generally, it is believed that telecines with continuous film motion provide the simplest and best operation if the problems of registration, weave, and jitter can be solved. Flying spot telecines of the continuous motion type require a means for supporting the moving film in a precise position with respect to the optical system of the telecine that focuses an image of the flying spot generated by a cathode ray tube (CRT) through the film. This precise position must be accurately maintained over an area at least as large as one film frame in order to maintain focus. The means for maintaining the position of the film is conventionally referred to as a "film gate". U.K. Patent Specification 1 519 398 describes a film gate that is curved in the direction of motion of the film in an optical system for focusing light on the film in the film gate, together with corrective optics.

In the popular Rank Cintel Mark III telecine, manufactured by The Rank Organisation Limited, London, England, the film gate has an entry or feed roller that receives the film from a supply reel, passes the film to a free-rolling single feed sprocket and under the lens assembly, and then discharges the film to an exit roller. A drive capstan pulls the film through the film gate. Neither the feed roller nor the exit roller nor the drive capstan include any edge guides. The teeth on the sprocket are generally of a square configuration and are substantially smaller than the sprocket holes in the film. As a result, it is believed that the sprocket teeth tend to align themselves with the trailing edge of the film sprocket hole because of drag. Because of the substantial variation between the size of the sprocket perforations and the sprocket teeth, as well as the lack of edge constraints, the film is free to weave or jitter not only in the lateral direction but also in the longitudinal direction.

While the picture quality and film handling performance of the Rank Cintel Mark III telecine is of the good quality for normal film-to-tape transfer, in terms of picture weave the machine leaves a lot to be desired. Although the amount of weave varies from machine to machine and from negative to negative, a typical amount of lateral (east-west) jitter of up to 140 nanoseconds is common. Mechanical alterations to the original Rank Cintel film gate to provide a single film guide roller has improved the weave error to the order of approximately 60 nanoseconds, but this amount of picture weave is still noticeable.

The reasons for film weave are believed by the present inventors to relate generally to the dimensional relationships of the recorded film image on the film stock and the tolerances involved in the manufacturing specification for the film. Most 35 mm color film stock in use today adheres to the tolerances established by the American National Standards Institute (ANSI), 1430 Broadway, New York, N.Y. 10018 (USA), under ANSI PH22.93-1980. This standard specifies the cutting and perforating dimensions for 35 mm motion picture film, with Bell & Howell (B&H) type perforations. Because film material is pliable and slightly elastic, it is difficult for the dimensional tolerances to be maintained for the film, and it is known that these dimensions fluctuate to a degree from film to film.

Moreover, it will be noted that the ANSI standard dimensions relating to the sprocket holes in the film are tolerant to ±10 microns, but by contrast, the edge to sprocket hole dimension has a tolerance of ±50 microns, which is five times less accurate. Accordingly, mechanical methods that rely solely upon edge guidance for the film, such as the above-mentioned modification for the Rank-Cintel Mark III, cannot reduce weave as much as is desired in the industry.

Other approaches to the problem of film weave and jitter rely upon electronic scanning of the sprocket holes and generation of correction signals used in the raster scanning process. U.S. Pat. Nos. 4,823,204 and 4,104,680 to Holland are directed to electronic methods and apparatus for correction of film weave, by scanning the sprocket hole of the film and generating a correction signal to compensate for the film weave. The film weave correction signal is then used to adjust the position of the scanning beam to compensate for motion of the film as detected by the scanning of the sprocket holes. However, systems that use the sprocket hole scanning approach are electronically complex and expensive.

Electronic methods for film weave correction that involve scanning of the sprocket holes such as U.S. Pat. Nos. 4,823,204 and 4,104,680 typically involve modifying the film gate of a telecine such that the sprocket hole area of the film may be scanned. Thus, a hole or slot must be machined in the film gate to permit the detecting beam to scan the sprocket hole. Additionally, it may be necessary to supply higher powered deflection amplifiers for the rapid deflection of the scanning beam of the light source to the sprocket hole area, or provision of a separate detecting beam, both of which add to the complexity and expense of these electronic methods for film weave correction.

As has been discussed previously, the conventional film gate used in a Rank telecine for 35 mm film includes a single feed sprocket. The teeth on this sprocket are very small relative to the dimensions of the film perforations and consequently does not prevent the weave or jitter of the film. In addition, the Rank mechanism only includes the single sprocket immediately preceding the frame aperture and thence to a roller without any teeth or other guides for imparting stability. There is consequently no control of film movement either going into or leaving the film gate.

U.S. Pat. No. 4,054,912 of Millward et al. describes a continuous film motion telecine apparatus in which an electrical signal representative of film shrinkage is derived from a measurement of the angular speed of a roller in non-slipping contact with film when the film is being driven at a constant frame rate, and in which the signal so derived is used to automatically adjust a registration adjusting means to compensate for such shrinkage. The registration adjusting means adjusts the vertical deflection waveform of the telecine raster-producing circuits, and is therefore considered an electronic correction device. Moreover, this patent appears solely directed to correcting for film shrinkage so as to compensate for the distance between complementary points on the scanning raster in each field that occur a fixed time apart so as to adjust the distance between the two field scans on a given film frame.

Accordingly, there is a need for a simple yet reliable apparatus for correcting film weave and jitter that does not rely upon expensive and complex electronics. There is also a need for a device for correcting film weave and jitter that does not rely solely upon edge guidance since it is known that the sprocket hole-to-film edge distance will vary significantly from film to film yet still remain within current standards. There is also a need for a simple, inexpensive, yet reliable device for reducing film weave and jitter to below 20 nanoseconds.

SUMMARY OF THE INVENTION

The present invention provides an improved film gate for a continuous motion telecine that is simple, completely mechanical, and does not rely upon any complex electronics such as sprocket hole scanners. Briefly described, the improved film gate comprises a precision milled entry roller that provides an edge guide function, a precision milled entry sprocket that positively registers one row of sprocket holes in the film immediately prior to the frame aperture, a precision milled exit sprocket that positively registers the row of sprocket holes in the film immediately subsequent to the frame aperture, and a precision milled exit roller that provides another edge guide function. A spring biased floating guide means provides further edge guidance of the film at the frame aperture.

More particularly described, the improved film gate comprises a housing for supporting and transporting the film in continuous motion past a scanning means on the telecine. The housing includes a frame aperture operative for receiving light from the telecine's light source, passing the light through the film, and directing the light to the telecine's light detector. A precision milled entry sprocket is positioned adjacent to the frame aperture for guiding the film across the frame aperture. The entry sprocket includes a ring of first sprocket teeth and a ring of second sprocket teeth. The first sprocket teeth are sized and shaped substantially in accordance with and to the tolerances of both the lateral and longitudinal dimensional specifications for the film sprocket holes, as established by film industry standards. The second sprocket teeth are sized and shaped substantially in accordance with and to the tolerances of the longitudinal dimensional specifications for the film sprocket holes.

A precision milled exit sprocket is positioned adjacent to the film aperture and receives the film after passing across the frame aperture. The exit sprocket also includes a ring of first sprocket teeth and a ring of second sprocket teeth. As in the entry sprocket, the first sprocket teeth of the exit sprocket are sized and shaped substantially in accordance with and to the tolerances of both the lateral and longitudinal dimensional specifications for the film sprocket holes. The second sprocket teeth of the exit sprocket are also sized and shaped substantially in accordance with and to the tolerances of the longitudinal dimensional specifications for the film sprocket holes.

By firmly and positively registering the first sprocket teeth in one row of sprocket holes along one side of the film in both the lateral and longitudinal direction, and by positively registering the opposite row of sprocket holes in the longitudinal dimension, the film is held steady both as it enters the frame aperture and as it exits the frame aperture, and imparts substantial stability to the film frame as it is scanned in the frame aperture.

Yet still more particularly described, the improved continuous motion film gate includes an entry guide roller mounted to the housing for receiving the film from a feed spool. The entry roller includes a central recessed portion having a width substantially the same as the width of the film, with outer guide portions adjacent the recessed portion. The film travels within the recessed portion and is held therein by the outer guide portions. An exit guide roller is also mounted to the housing for receiving the film from the exit sprocket and guiding the film to a film receiving means on the telecine, for example, the drive capstan in a continuous motion telecine. The exit roller also includes a central recessed portion having a width substantially the same as that of the film, and outer guide portions adjacent the recessed portion. Again, the film is positioned within the recessed portion as it is moved. The provision of the edge guidance in the entry roller and exit roller lends further lateral stability to the film as it is fed to the entry sprocket and removed from the exit sprocket.

A film gate according to the present invention preferably further comprises a floating guide means mounted to the housing for supporting and steadily guiding at least one edge of the film as it moves past the film aperture. The preferred floating guide means comprises a fixed first guide that is mounted to the housing and including a horizontal skid rail for slidably supporting the film edge, and a vertical rail for contacting one edge of the film. The guide means further includes a movable or "floating" second guide comprising a horizontal skid rail for slidably supporting the opposite film edge, and a vertical rail for contacting the opposite edge of the film. A means for biasing the movable second guide against its respective film edge is provided. By biasing the movable second guide lightly against the film edge as it passes across the frame aperture, yet more lateral stability is imparted to the film as it is scanned.

The floating guide means, together with the precision milled entry and exit sprockets and precision milled recessed entry and exit guide rollers, provide a combination of stable platforms for stabilizing the film as it approaches the frame aperture and holding the film steady as it passes across the frame aperture and is scanned. In this manner, the present invention substantially improves upon prior art film gates that rely upon capstan drives without any guide means, or rely solely upon sprocket drives or edge guidance. In addition, a capstan-drive continuous motion telecine employing a film gate constructed as in the present invention inflicts substantially less wear and tear on the film than intermittent-type telecines.

Accordingly, it is an object of the present invention to provide an improved film gate for a continuous motion or real-time motion picture telecine.

It is another object of the present invention to provide an improved continuous motion film gate for a telecine that substantially reduces film weave and jitter produced as a result of non-registration of the film relative to the frame aperture.

It is another object of the present invention to provide an apparatus for reducing film weave in a telecine to less than 20 nanoseconds.

It is another object of the present invention to provide an improved continuous motion film gate for a telecine that provides a plurality of stable supports and guides for a motion picture film as it passes across a frame aperture in the telecine.

It is another object of the present invention to provide an improved continuous motion film gate for a telecine that positively registers at least one series of film perforations at both an entry point and exit point of a frame aperture to impart lateral and longitudinal stability to the film while it is scanned.

It is another object of the present invention to provide an improved continuous motion film gate for a telecine that uses precision milled entry and exit sprockets together with a spring biased film guide to support the film as it is scanned.

These and other objects, features, and advantages of the present invention will become more clear upon reference to the accompanying drawings and the following detailed description.

DETAILED DESCRIPTION OF THE PREFERRED EMBODIMENT

Figure 1:
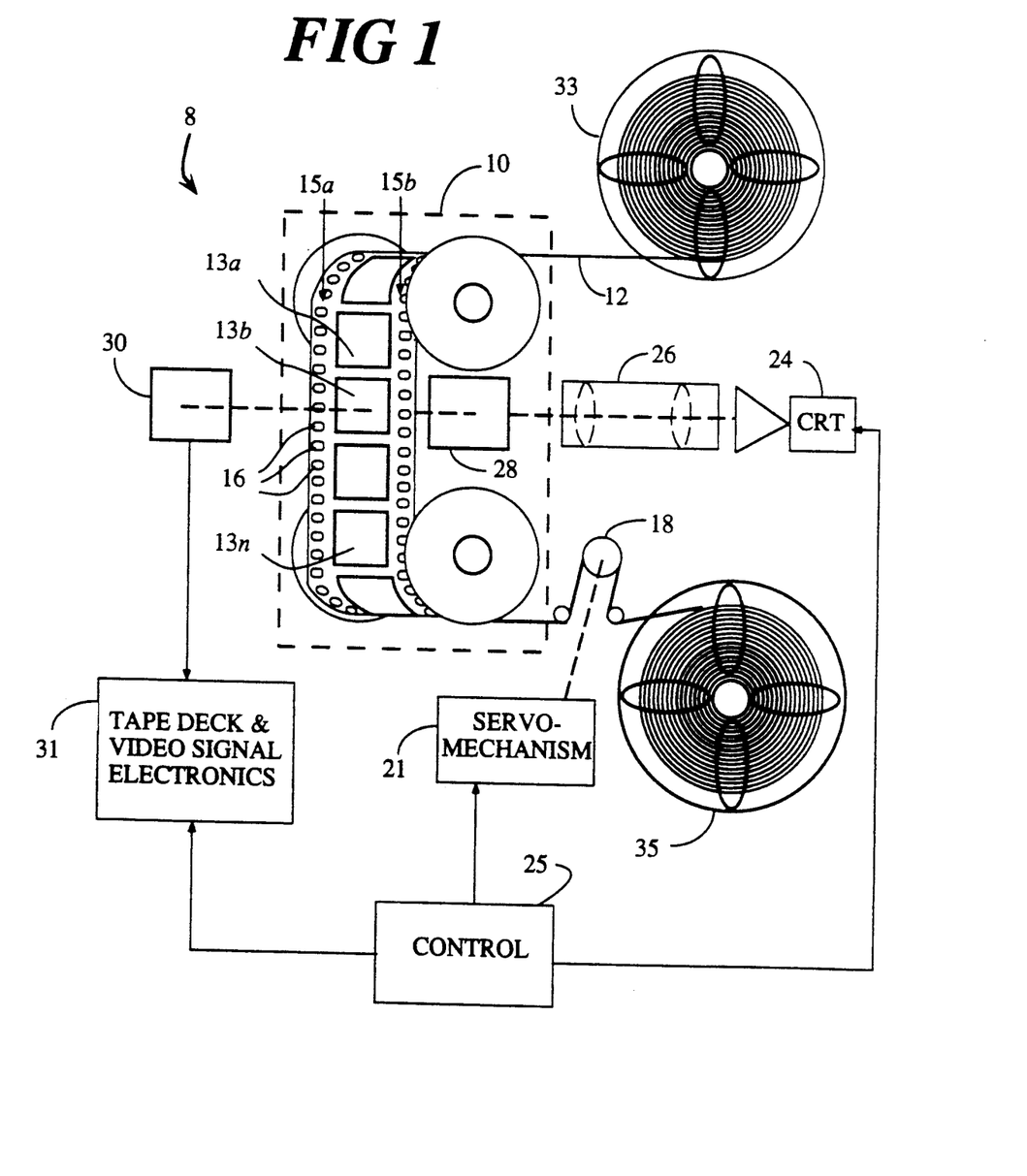
FIG. 1 schematically illustrates the process of transferring a motion picture film to a video signal in a telecine, and shows the position and function of a film gate in the telecine.

Referring now to the drawings, in which like numerals indicate like elements throughout the several views, FIG. 1 schematically illustrates a motion picture telecine 8 that incorporates the preferred embodiment of an improved continuous motion film gate 10 constructed in accordance with the present invention. As will be known to those skilled in the art, a telecine such as the one 8 illustrated in FIG. 1 is used for film-to-video tape transfers. These film-to-tape transfers are conducted by scanning a film 12, typically 35 mm or 16 mm movie film, by a light source. The film 12 is provided in continuous motion or "real time" from a supply reel 33 to the film gate 10, which supports the film during scanning. The film 12 will be understood to comprise a plurality of frames 13a, 13b, ... 13n supported on the substrate of the film. The film 12 also includes two rows 15a, 15b of perforations 16, one row along each longitudinal edge of the film. The film is typically pulled through the gate 10 by a frictional drive capstan 18 that is powered by servomechanism 21.

The telecine 8 further includes a source of light 24 such as a cathode ray tube (CRT), laser light, or light bulb. The light source 24 is controlled by control circuit 25, which is also connected to the servomechanism 21, so that scanning of each frame 13 on the film will be synchronized to the movement of the film. The light from the light source 24 passes through a lens assembly 26, through a light or frame aperture 28 in the film gate 10, through the film, and onto a light detecting means or "cell box" 30. The lens assembly 26 focuses the light from the light source onto the film. The light detecting means or cell box 30 produces a video signal corresponding to the image on the film. The video signal is typically provided to a magnetic tape recorder or deck 31.

A typical telecine of the type with which the present invention is useful is a Mark III telecine manufactured and sold by Rank Cintel, associated with The Rank Organisation, Ltd., London, England. U.S. Pat. No. 4,184,177 is exemplary of the Rank Cintel telecine apparatus for consecutive frame scanning of continuous motion film, and the disclosure is incorporated herein. However, the present invention is also useful with other types of telecines, such as those that use a light bulb to project the film frame image onto a charge-coupled device (CCD) imaging sensor array.

Those skilled in the art will understand that in the television production and post-production industry, film-to-tape transfer telecine apparatus are often used in conjunction with fresh 35 mm motion picture film that has recently been obtained from a motion picture camera. This is in contrast to telecine devices operative with theater release film prints that include sprocket holes manufactured to a different specification. Motion picture camera film typically is manufactured to ANSI Standard PH22.93-1980, with Bell & Howell (B&H) perforations. Currently popular camera film includes the improved Kodak rounded ("KR") perforations with 0.005 inch corner radii for minimizing the weakness for tearing at the corners of the film perforations.

Figure 2:
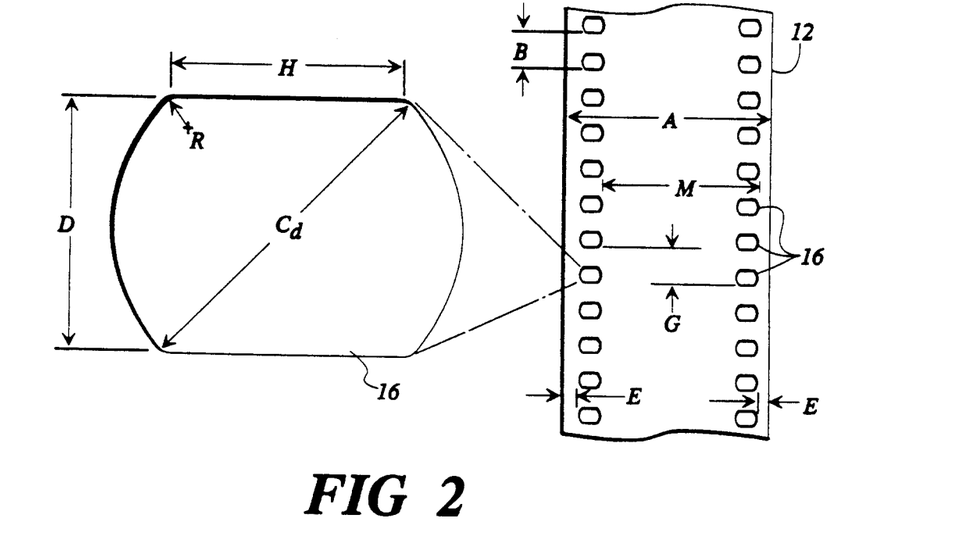
FIG. 2 illustrates a section of 35 mm motion picture film manufactured to the specifications of the ANSI standards including B&H perforations and KR corners.

With reference to FIG. 2, the following is a table of specifications for 35 mm motion picture film as set forth in ANSI standard PH22.93-1980:

| | DIMENSIONS | INCHES | MILLIMETERS |
|---|---|---|---|
| A | Film width | 1.377 ± 0.001 | 34.975 ± 0.025 |
| B | Perforation pitch (long) | 0.1870 ± 0.0004 | 4.750 ± 0.010 |
| B' | Perforation pitch (short) | 0.1866 ± 0.0004 | 4.740 ± 0.010 |
| $C_d$ | Perforation width (diameter) | 0.1100 ± 0.0004 | 2.794 ± 0.010 |
| D | Perforation height | 0.0730 ± 0.0004 | 1.854 ± 0.001 |
| E | Edge to perforation | 0.079 ± 0.002 | 2.01 ± 0.05 |
| G | Perforation misalignment | 0.001 max | 0.03 max |
| H | Perforation chord width (BH perforation) | 0.082 calculated | 2.08 calculated |
| L | 100 consecutive perforation pitches (long) | 18.700 ± 0.015 | 474.98 ± 0.38 |
| L' | 100 consecutive perforation pitches (short) | 18.660 ± 0.015 | 473.96 ± 0.38 |
| M | Lateral perforation displacement | 1.109 ± 0.001 | 28.17 ± 0.03 |
| R | Corner radius | 0.005 max | 0.13 max |

It should be understood at this juncture that films not intended for use in pin registration systems, for example 35 mm color print film incorporating Kodak standard (KS) perforations, being typically used only for release or theater prints, may not benefit from the advantages provided by the present invention with the use of 35 mm color negative film.

Figure 3:
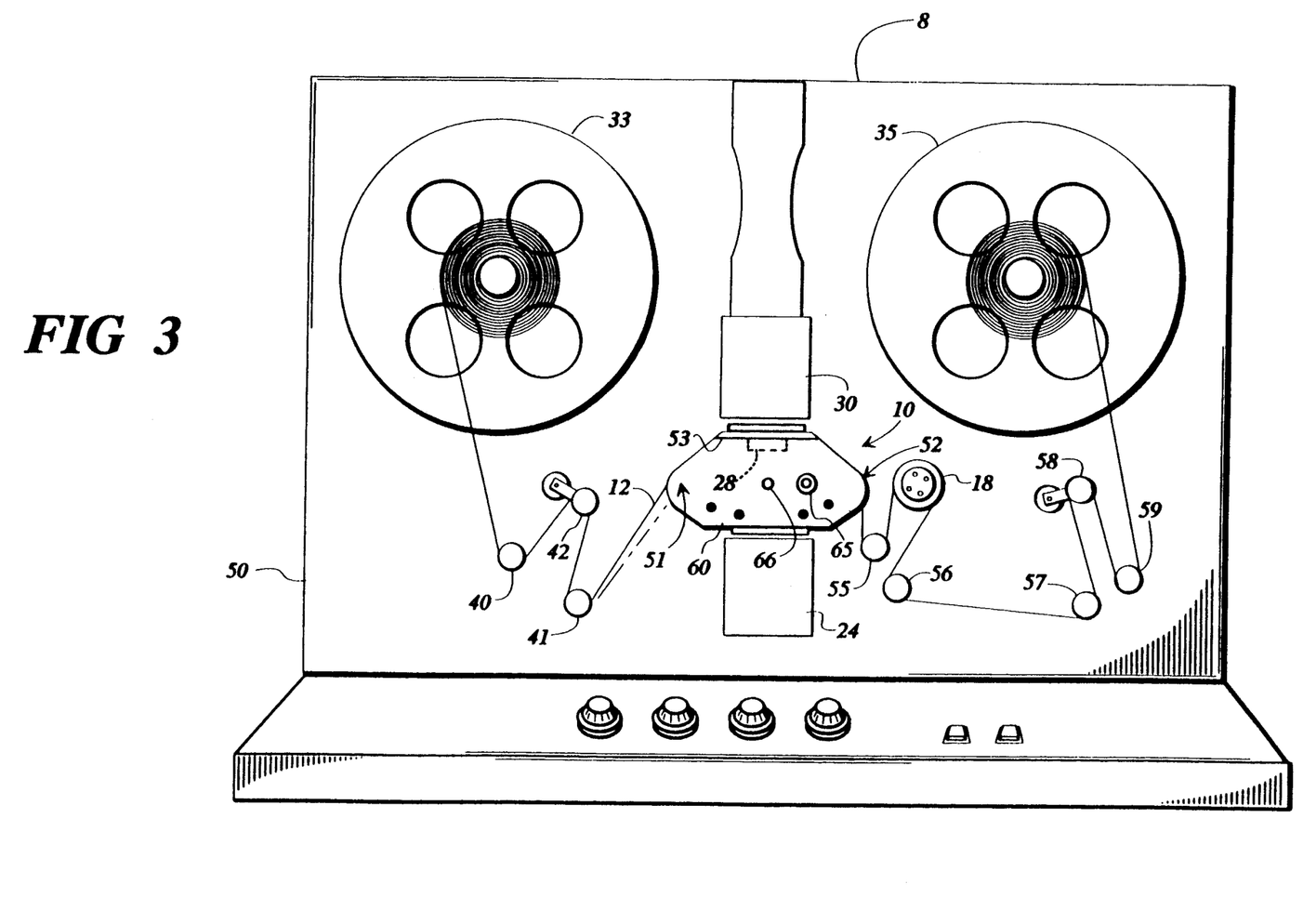
FIG. 3 illustrates the front panel of a typical motion picture telecine with which the present invention is used, showing the placement of the preferred embodiment of an improved film gate constructed in accordance with the present invention.

FIG. 3 illustrates the front panel 50 of a Rank Cintel Mark III telecine 8 incorporating the preferred embodiment of a continuous motion film gate 10 constructed in accordance with the present invention. The film 12 is supplied from a supply reel 33 via a series of idler rollers 40, 41 and tensioning roller 42 to the film gate 10. The film enters the film gate 10 at an entry end 51 of the film gate, over the frame aperature 28, and thence from an exit end 52. The film then passes over idler rollers 55, 56 to loop around a drive capstan 18. After exiting the rollers associated with the capstan 18, the film passes over idler roller 57, tensioning roller 58, and idler roller 59 before being taken up by the take up reel 35.

The film 12 is inserted into the film gate 10 at a front loading slit 53 provided in the front panel of the film gate. The front loading slit 53 allows the film to be inserted along a pathway substantially parallel to the horizontal pathway of the film across the frame aperture 28, thereby providing for convenient and quick front loading of the film gate.

A CRT 24 or other light source on the telecine directs light through the film gate 10, the internal lens assembly 26 (not visible in FIG. 3), frame aperture 28, the film, and thence into the light detecting means 30. A focusing knob 65 on the front panel of the film gate allows the internal lens assembly to be adjusted and then locked into position with a locking knob 66.

The CRT 24 and light detecting means 30 comprise a film scanning means associated with the telecine. Inasmuch as the construction and operation of the scanning means and other aspects of the telecine 8 do not form a part of the present invention, further discussion of same will not be provided herein.

Figure 4:
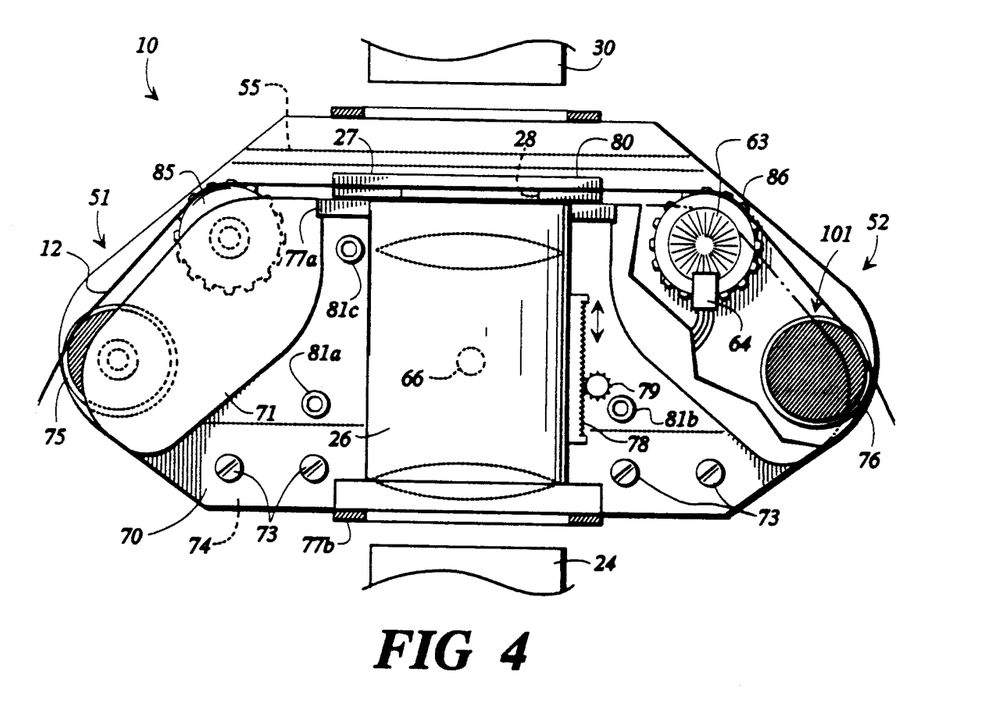
FIG. 4 is a front plan view of the preferred embodiment of an improved film gate constructed in accordance with the present invention, with the front panel removed to illustrate the internal components, partially broken away.

Turning next to FIG. 4, the improved film gate 10 comprises several precision milled guides, sprockets, and entry and exit rollers that individually, and in combination, stabilize the film as it moves past the frame aperture 28.

The preferred embodiment of the film gate comprises a housing 70 for supporting and transporting the film 12 in continuous motion past the scanning means on the telecine. The housing supports an aperture plate 27 having a frame aperture 28 defined therein for transmitting light from the light source 24 through a frame on the film and thence to the light detector 30. A front cover or panel 60 (visible in FIG. 3) has been removed from the view of FIG. 4 so that the internal components of the film gate may be seen.

The housing 70 comprises a first or outer support block 71, a second or inner support block 72 positioned toward the telecine, and a central support block 74 (shown in dotted lines, and better seen in FIG. 5) positioned between the blocks 71, 72. The support blocks 71, 72 have precisely milled faces and are fastened to the central support block 74 with a plurality of screws 73.

The support blocks 71, 72 support precision milled entry and exit guide rollers 75, 76 and entry and exit sprockets 85, 86. As shown in FIG. 4, the entry guide roller 75 is positioned to receive the film 12 as it enters the film gate and direct the film upwardly at an angle to the entry sprocket 85. The entry sprocket 85 redirects the film to a horizontal plane and across the aperture plate 27 and frame aperture 28. After passing across the frame aperture 28, the film is directed on the horizontal to the exit sprocket 86, and then downwardly at an angle to the exit guide roller 76. After leaving the film gate, the film goes to the telecine idler roller 55 (FIG. 3).

The lens assembly 26 is positioned in an open space defined between the entry end 51 and exit end 52, and receives light from the light source 24. The lens assembly is supported for vertical movement in the central support block 74 with upper and lower supports 77a, 77b. The barrel of the lens assembly includes a toothed rack 78 and is moved vertically for focussing the light with a gear 79 that is rotated by the knob 65 (FIG. 3). Once the light is properly focussed onto the film plane, the lens assembly is locked into place with a locking screw moved by the locking knob 66 (FIG. 3).

Preferably, an optical shaft encoder is connected to the exit sprocket 86 beneath the front cover 60 for precise frame counting. The preferred optical shaft encoder comprises a thin, transparent disk 63 having precisely spaced markings that rotates within a light source and detector assembly 64. The light source and detector includes an integral light source and light detector that is operative for transmitting light through the disk 63 and detecting the passage and interruption of the light caused by the markings on the disk. Inasmuch as the structure of such optical shaft encoders will be known to those skilled in the art, no further discussion is believed necessary.

Also shown in FIG. 4 are a plurality of Allen-head adjusting studs 81a, 81b, 81c arranged in a generally triangular array. The adjusting studs are fitted in threaded bores in the inner support block 72 that extend completely through and open on the back surface of the inner support block. Mating access bores (not visible in FIG. 4) allow access through the outer support block 71 for an Allen wrench. With the cover 60 removed, the adjusting studs 81 can be adjusted to compensate for slight spacing adjustments of the film gate 10 relative to the front panel 50 of the telecine 8, as well as for slight alignment adjustments to the angle of the film path relative to the face of the telecine.

Figure 5:
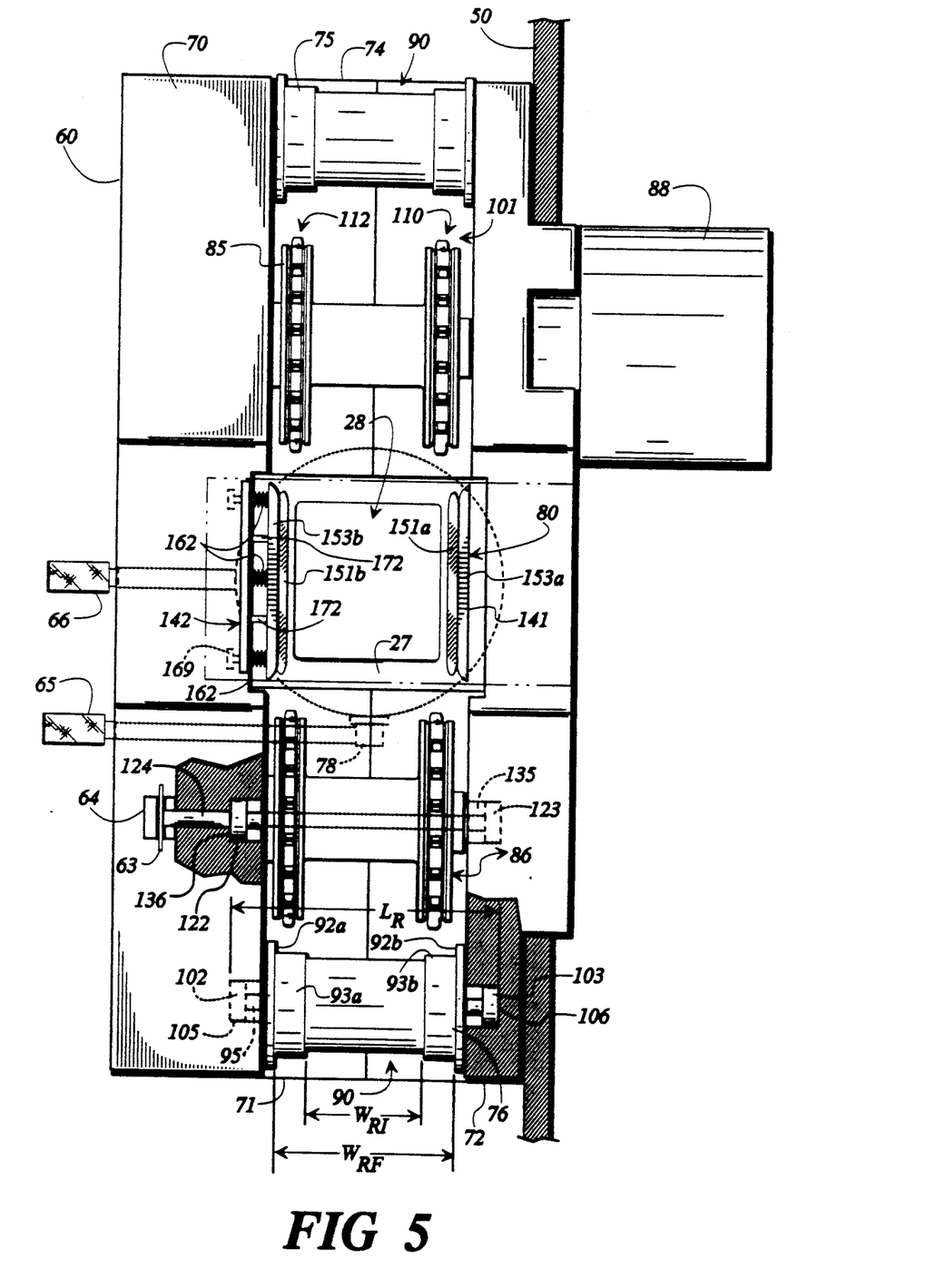
FIG. 5 is a top plan view of the preferred film gate shown in FIG. 4.
Figure 6:
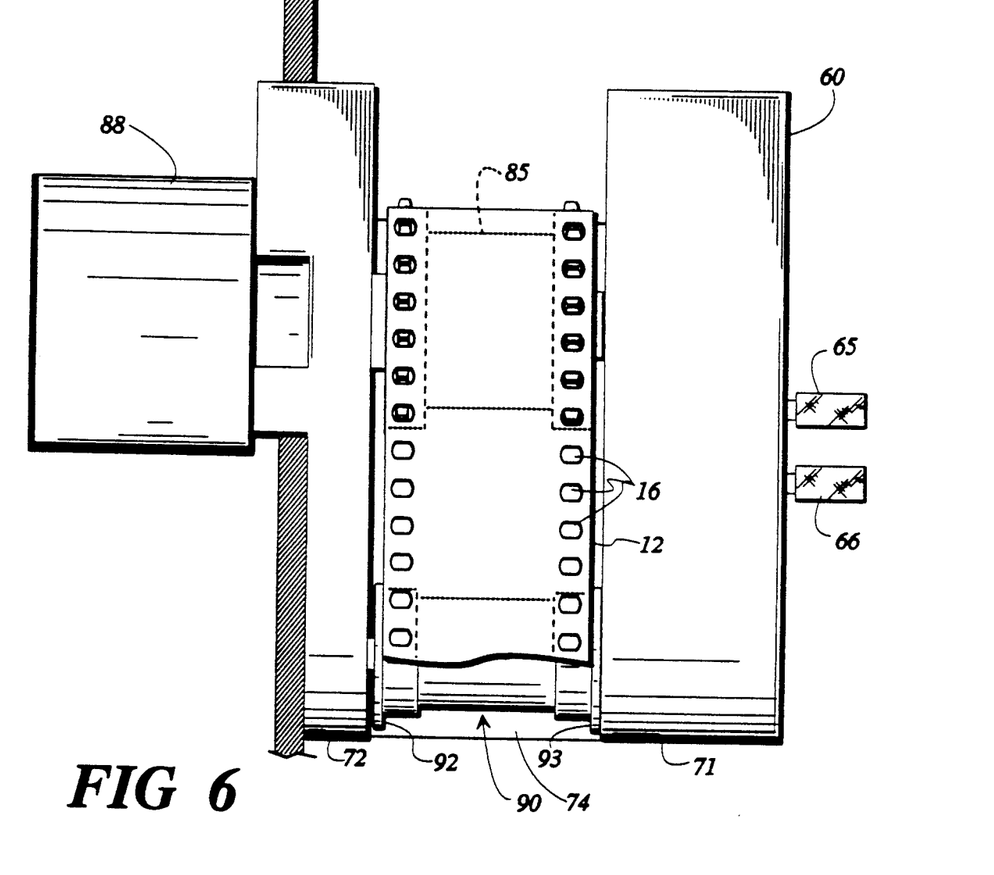
FIG. 6 is a left end view of the preferred film gate shown in FIG. 4.

Turning now to FIG. 5, in the disclosed embodiment a conventional shaft encoder 88 is affixed to the axle of, and rotates with, the sprocket 85. This shaft encoder provides movement signals to the telecine 8 in the usual manner, for detecting "active stop" to center a frame on a monitor associated with the telecine. The shaft encoder 88 extends into an opening defined in the front panel 50 of the telecine and is housed therein during normal operation.

As best seen in FIG. 5, both the entry guide roller 75 and exit guide roller 76 are precision milled metal and include a central recessed portion 90, outer guide portions or rims 92a, 92b that serve as confining edge guides, and film edge supports 93a, 93b. The distance between the outer guide portions or rims 92a, 92b is a width $W_{RF}$ substantially the same as that of the film 12. In the preferred embodiment, the width $W_{RF}$ is 35.025 mm, ±0.001 mm, which is slightly less than the upper limit of the ANSI standard for 35 mm film. The ANSI standard (PH22.93-1980) for a 35 mm film is 34.975±0.025 mm. It will thus be appreciated that the film is substantially confined within the outer guide portions or rims 92a, 92b that serve as confining edge guides of both the entry guide roller 75 and exit guide roller 76 as it enters and leaves the film gate, and that these rollers impart substantial stability to the film as it moves.

The central recessed portion 90 is provided on the rollers 75, 76 so that the imaged or exposed area of the film 12 does not touch or otherwise contact with the rollers, to prevent scratching or other damage to the film. It will thus be understood that the film is supported on the film edge supports 93a, 93b that contact with and support the perforated film edges. The distance between the film edge supports 93a, 93b in the preferred embodiment is a width $W_{RI}$ substantially that of the imaged or exposed area of the film 12, that is, the width of the film A less twice the width (diameter) $C_d$ of a perforation plus the edge to perforation distance E, at least within the tolerances for that of the film itself.

Both entry and exit rollers 75, 76 are supported for free rotatable motion with an axle 95. As best seen in FIGS. 4 and 5, the guide rollers 75, 76 are supported within a cavity 101 defined in the housing 70 above the center support block 74 and between the support blocks 71, 72, and have an overall longitudinal dimension $L_R$. Precision roller bearings 102, 103 are press-fitted to the axle 95 for rotatable motion but substantially prevent any axial movement of the entry and exit guide rollers 75, 76. The preferred roller bearings 102, 103 have a ¼ inch interior bore, ⅜ inch exterior, and permit less than 0.0005 inches of longitudinal (axial) movement, such as a model 607-ZZ precision bearing manufactured by Consolidated Bearing Company.

Wells 105, 106 are provided in the outer support block 71 and inner support block 72, respectively, for supporting the rollers 75, 76 and associated bearings. The depth of these wells, ⅜ inch in the disclosed embodiment, is precisely machined so that the rollers and their press-fitted bearings fit tightly in the cavity 101 but are free for rotatable movement with extremely little axial movement. Accordingly, the longitudinal cavity dimension $L_R$ is same as the overall longitudinal dimension of the rollers 75, 76 including their respective axles and bearings, within a predetermined longitudinal tolerance of ±0.0005 inches or less.

While the preferred embodiment employs tightly machined wells and finely toleranced parts to minimize axial movement of the rollers, it will be understood that a locking mechanism or screws could be employed to provide for axially adjusting and locking the position of the rollers.

Being slightly on the high side of the film width specification, the outer edge guides 92a, 92b of the rollers 75, 76 confine the film within a channel defined by edge guides. It will be seen in FIG. 4 that the rollers 75, 76 are mounted to the housing 70 such that the film 12 contacts with a circumferential portion of the rollers, an angular sector within the range of about 10°-25°. This is believed to provide sufficient contact between the film 12 and the guide rollers to substantially stabilize the film before it leaves the roller. When compared to the width of the standard film guides employed in the Rank Cintel Mark III, at 36.5 mm, a guide roller constructed in accordance with the present invention imparts substantial lateral stability to the film as it moves onto the entry sprocket 85 or is received from the exit sprocket 86.

Figure 7:
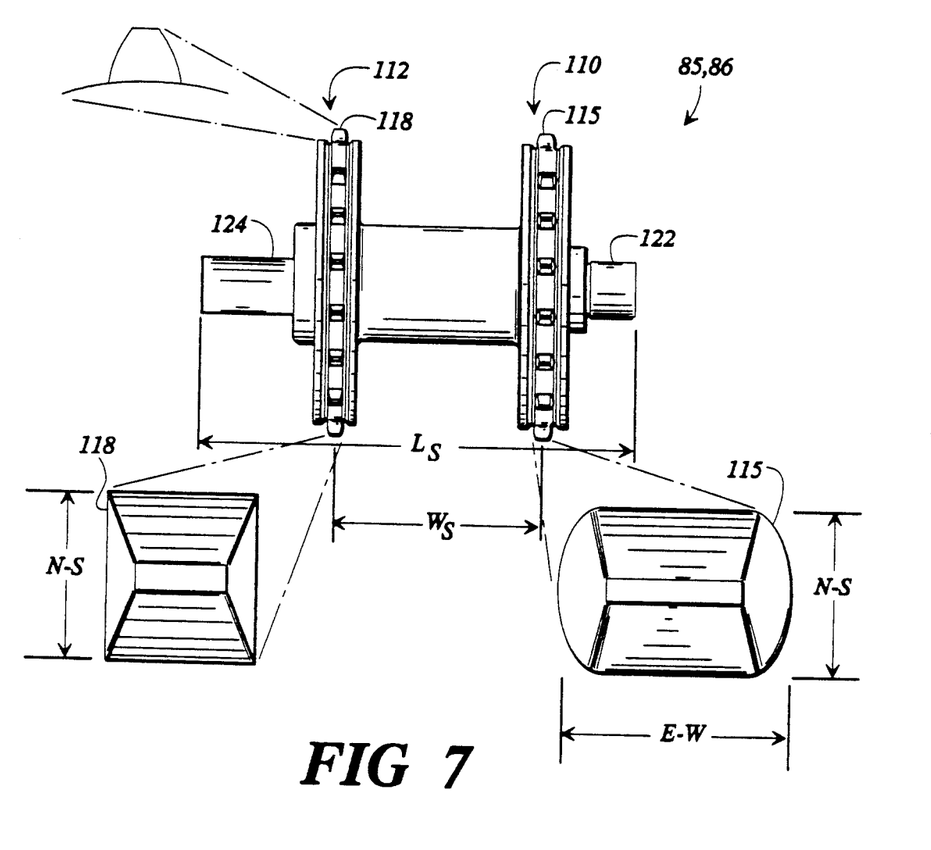
FIG. 7 illustrates a precision milled sprocket employed as an entry sprocket and an exit sprocket in the preferred film gate of FIG. 4, with magnified top views of the sprocket tines or teeth.

Other means are provided in the present invention for substantially reducing, if not eliminating, film weave. FIG. 7 illustrates one of the precision milled sprockets 85, 86 that comprise further means for reducing film weave and jitter. Each sprocket 85, 86 in the preferred embodiment is mounted in the housing 70 adjacent to the aperture plate 27 and directs the film along a horizontal path across the frame aperture 28, with the entry sprocket 85 guiding the film on to the aperture plate and the exit sprocket 86 leading the film away from the aperture plate.

It being understood that the sprockets 85 and 86 are similarly constructed, each sprocket 85 includes a ring of first sprocket teeth 110 and the ring of sprocket teeth 112. Each tooth or tine 115 of the ring 110 of first sprocket teeth are sized and shaped substantially in accordance with both the lateral (E-W) and longitudinal dimensional (N-S) specifications for the film sprocket holes, as determined by the above referenced ANSI standard. An exploded of one of the teeth 115 in the ring of first teeth 110 is shown expanded in FIG. 7.

Each tooth or tine 118 of the ring 112 of second teeth are sized and shaped substantially in accordance with the longitudinal (N-S) dimensional specifications for the film sprocket holes, according to the ANSI standard, and thus is smaller than the teeth 115 in the E-W direction. An exemplary one of the smaller sprocket teeth 118 is shown in the expanded view of FIG. 7.

The rings 110, 112 of sprocket teeth are spaced apart at a width $W_S$ according by that of the referenced ANSI standard specification for 35 mm film width, within the tolerance of that for the film itself.

Both entry and exit sprockets 85, 86 are supported for free rotatable motion with an axle 124. As best seen in FIGS. 4, 5 and 7, the sprockets 85, 86 are supported within the cavity 101 defined in the housing 70 and have an overall longitudinal dimension $L_S$ (including bearings). Precision roller bearings 122, 123 are press-fitted to the axle 124 for rotatable motion but substantially prevent any axial movement of the sprockets. The preferred roller bearings 122, 123 are similar to those used in connection with the rollers, have a ¼ inch interior bore, ¾ inch exterior, and permit less than 0.0005 inches of longitudinal (axial) movement, such as a model 607-ZZ precision bearing manufactured by Consolidated Bearing Company.

Wells 135, 136 are provided in the outer support block 71 and inner support block 72, respectively, for supporting the sprockets 85, 86 and associated bearings. The depth of these wells is ⅜ inch in the disclosed embodiment and is precisely machined so that the sprockets and their press-fitted bearings fit tightly in the cavity 101 but are free for rotatable movement with extremely little axial movement. Accordingly, the cavity dimension $L_S$ is same as the overall longitudinal dimension of the sprockets 85, 86 including their respective axles and bearings, within a predetermined longitudinal tolerance of ±0.0005 inches or less.

While the preferred embodiment employs tightly machined wells and finely toleranced parts to minimize axial movement of the sprockets, it will be understood that a locking mechanism or screws could be employed to provide for axially adjusting and locking the position of the sprockets. Moreover, it will also be understood that the axles in the preferred embodiment are actually longer than $L_S$ so as to provide for attachment of the encoder disk 63 and optical shaft encoder 88.

Those skilled in the art will understand and appreciate that the combination of the tightly maintained dimensions (and tolerances) for the sprocket, the preferred roller bearings, and the cavity 101 provide an extremely stable rolling platform for the sprocket 85 that permits substantially no lateral (axial) movement of the sprocket.

Figure 8:
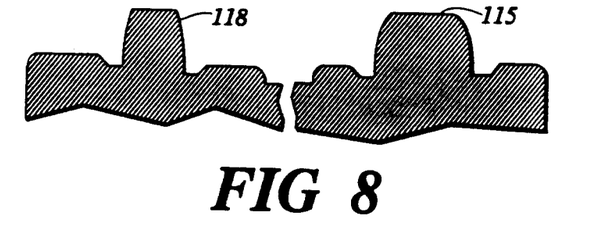
FIG. 8 provides front and side elevation views of the sprocket tines or teeth employed in the sprocket of FIG. 7.

As shown in FIG. 8, each tooth 115 in the ring 110 of first sprocket teeth is precision milled at its base (the juncture with the circumferential support surface of the sprocket) to dimensions substantially in accordance with the longitudinal and lateral dimensional specifications for the film sprocket holes, with Bell & Howell (B&H) perforations, including Kodak rounded (KR) corners. It will also be observed that each tooth 118 of the ring 112 of second sprocket teeth are also manufactured and milled substantially in accordance with the longitudinal dimensional specification (that is, in a circumferential direction) substantially in accordance with the longitudinal dimensional specification for the film sprocket holes. It will therefore be appreciated that the larger sprocket teeth 115 provide full registration in both the east-west (E-W) and the north-south (N-S) direction in the film sprocket holes, whereas the smaller sprocket teeth 118 provides registration in the N-S direction. This provides for full registration and lateral and longitudinal stability for movement of the film yet, still allows for film shrinkage. It is believed important to have N-S registration on both teeth so as to provide for lateral stability.

In comparison, only a single sprocket is provided in the Rank Cintel Mark III telecine, not dual sprockets, and the teeth in both rings in the sprocket are of the same size and shape. Moreover, the teeth in the Rank film gate sprocket are manufactured, it is believed, to roughly ten percent tolerance values as opposed to the ten micron tolerance values as in the present invention. It will therefore be understood that the conventional single Rank film gate sprocket does not and cannot provide full pin registration in either row of sprocket holes in the film, and substantial weave is not only possible, but inevitable.

Referring again to FIG. 4, it will be recalled that the film 12 enters the aperture plate 27 and passes over the frame aperture 28 along a substantially horizontal plane or pathway. It will be seen that the entry sprocket 85 is mounted to the housing 70 such that the film 12 contacts with a circumferential portion of the entry sprocket 85 (an angular sector of approximately 30°-45°), yet exits the entry sprocket at a tangent to the entry sprocket and then on to the horizontal pathway. This is believed to provide sufficient contact between the film 12 and sprocket 85 to register 3-5 teeth in the film and substantially stabilize the film before it passes across the frame aperture.

It will also be seen in FIG. 4 that the exit sprocket 86 is mounted to the housing 70 such that the film exits the horizontal pathway from the aperture plate 27, enters the exit sprocket tangentially, and thence contacts with a similar circumferential portion of the exit sprocket (an angular sector of approximately 30°-45°) before being directed downwardly at an angle to the exit guide roller 76. Again, this is believed to provide sufficient contact between the film 12 and sprocket 86 to register 3-5 teeth in the film and maintain stability in the film as it leaves the frame aperture.

Yet other means are provided in the preferred film gate 10 for stabilizing the film and reducing weave. The top plan view of FIG. 5 illustrates a floating edge guide means 80 mounted to the housing 70 for supporting and steadying the film as it moves past the film aperture 28. The floating guide means 80 in the preferred embodiment comprises a fixed first edge guide 141 that is mounted along one side of the film aperture 28, preferably the inside or telecine side, oriented in the direction of film travel. A movable second edge guide 142 is mounted on the opposite side of the frame aperture 28, preferably on the outside or front cover side. It will thus be understood that, in the preferred embodiment, the fixed edge guide 141 is aligned with the larger teeth 115 of the first row 110 of teeth in the sprockets 85, 86, while the moveable edge guide 142 is aligned with the smaller teeth 118 of the second row 112 of teeth in the sprockets.

Figure 9:
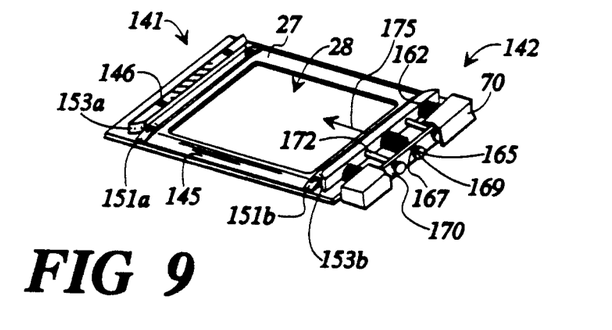
FIG. 9 is a perspective view of the aperture plate employed in the preferred film gate of FIG. 4, illustrating the construction of the floating guide means.

Referring to FIGS. 5 and 9, the frame aperture 28 is an opening in a recessed surface 145 in the aperture plate 27. The surface 145 is recessed beneath the plane of travel of the film so that there is no contact with the imaged or exposed region of the film.

The fixed first guide 141 preferably comprises a horizontal skid rail 151a for slidably supporting the film edge, and a vertical rail 153a for contacting with the outer edge of the film, but not contacting the imaged portion of the film. The horizontal skid rail 151a is preferably a surface of the aperture plate 27, slightly elevated relative to the recessed surface 145. The vertical rail 153a is preferably a separate element fastened into the aperture plate 27 with screws 147 or the like. The screws 147 are preferably fitted into the aperture plate to allow alignment and adjustment of the vertical rail 153a in multiple axes. Preferably, both the horizontal skid rail 151a and the vertical rail 153a are slightly tapered at the leading edges so as to minimize the likelihood of "catching" on a film splice or broken film perforation.

Similarly, the movable second guide 142 comprises a horizontal skid rail 151b for slidably supporting the opposite film edge, and a vertical rail 153b for contacting the opposite edge of the film. The horizontal skid rail 151b is preferably a surface of the aperture plate 27, slightly elevated relative to the recessed surface 145.

Preferably, the surfaces of the horizontal skid rails 151a, 151b and the vertical rails 153a, 153b are coated with an anti-friction coating such as NITUFF ® aluminum surface coating, manufactured by Nimet Industries, Inc., South Bend, Ind., or the like, or a ceramic coating, to minimize drag and wear on the film.

The floating guide means 80 further comprises means 160 for biasing the movable second guide 142 against its respective film edge, inwardly of the frame aperture 28, toward the telecine 8. This biasing urges the film toward the inside of the film gate, that is, toward the telecine. The preferred biasing means 160 preferably comprises a plurality of coiled springs 162 for biasing the movable second guide 142 inwardly of the frame aperture 28.

As shown in FIG. 9, the movable guide 142 is supported for movement by at least one first support pin or rod 165 that is firmly affixed by threading or the like into the vertical rail 153b, and extends through a hole 167 in a rail support 170 that is mounted to the upper surface of the housing 70. The support pin 165 terminates in an enlarged head 169 that is larger than the diameter of the hole 167 and serves as a motion stop.

A second pin or rod 172 is firmly affixed into rail support 170 and slidably extends through a hole in the vertical rail 153b as a movement guide for the rail.

The first pin or rod 165 passes through the center of one of the coiled springs 162 that is positioned between the vertical rail 153b and the support rail 170. The spring 162 biases the movable second edge guide outwardly away from the support rail in the direction of arrow 175.

It will understood from the foregoing that the vertical rails 153a, 153b confine the edges of the film. It will also be appreciated that the floating guide means 80 confines and stabilizes the film 12 as it is moved across the frame aperture 28, lending further lateral stability to the film during scanning by the telecine. By itself, and in combination with the other stabilizing elements of dual sprockets 85, 86 and dual guide rollers 75, 76, the floating guide means substantially reduces weave and jitter during scanning of the film.

From the foregoing, it will now be appreciated that the larger or first sprocket teeth 115 maintain a snug fit in a plurality of perforation holes of the film to one side of the image in both the N-S and the E-W direction, to provide full perforation registration, while the other, smaller pins 118 maintain a loose clearance fit in the E-W direction but a snug fit in the N-S direction. It will therefore be appreciated that given reasonable limits and variations in film tolerance, the film will be located in both planes in a very satisfactory and stable manner. The combination of the entry guide roller, entry sprocket, substantially horizontal film path, exit sprocket, and exit guide roller, together with the floating guide means, imparts substantial longitudinal and lateral stability to a film as it passes over the frame aperture and is scanned by the telecine.

It will be further appreciated that the present invention restores the sprocket hole/image relationship that is determined as a function of the placement of the image on the film in the camera, and thus the stability of the picture as respects weave is substantially improved compared to that of conventional telecine devices used in production and post-production facilities. Post-production activities such as mattes, titles, computer graphics and motion control material and animation can now be steadily interwoven and imposed with moving film in a manner that has heretofore not been possible prior to the present invention without the use of complex and expensive electronic film weave compensation devices. With the use of the present invention, the amount of weave and jitter in many telecines may be effectively and inexpensively reduced to less than 20 nanoseconds.

Modifications to the present invention may occur to those skilled in the art. It is specifically contemplated that sprockets such as the sprockets 85, 86 may be substituted for the rollers 75, 76, and thereby provide further stabilization for the film. Moreover, it is also expected that the relative positions of the sprockets and rollers may be interchanged, so that the sprockets are positioned at the entry points to the film gate with the rollers adjacent to the frame aperture 28, or that the sprockets and rollers may alternate. Accordingly, it will be appreciated that the positioning of the two different stabilizing means, the sprockets and the rollers, may be varied in position and number while satisfying the objectives of the invention.

The preferred embodiment of the present invention has been disclosed by way of example and it will be understood that other modifications may occur to those skilled in the art without departing from the scope and the spirit of the appended claims. H

What is claimed is:

1. An improved continuous motion film gate for a motion picture telecine, comprising:
   a housing for supporting and transporting a film in continuous motion past a scanning means on the telecine, said housing including a frame aperture operative for receiving light from a light source that passes through the film and directing the light to the telecine scanning means;
   an entry sprocket positioned along a path prior to and adjacent to said frame aperture for guiding the film across said frame aperture, said entry sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes; and
   an exit sprocket positioned along a path subsequent and adjacent to said frame aperture for receiving the film after passing across said frame aperture.
   said exit sprocket being independent of said entry sprocket;
   said exit sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes.

2. The improved film gate of claim 1, further comprising an optical shaft encoder affixed to the axis of one of said film stabilizing means for providing a plurality of encoder pulses to a control means associated with said telecine.

3. The improved film gate of claim 1, further comprising means for loading said film into said film gate from the front of said film gate through a loading slit.

4. The improved film gate of claim 1, further comprising adjustable focus lens means for directing light from said light source onto said film.

5. The improved film gate of claim 1, further comprising an entry guide roller mounted to said housing for receiving the film from a feed spool and directing the film onto said entry sprocket, said entry roller having a central recessed portion of a width substantially the same as the film, and outer guide portions adjacent said recessed portion.

6. The improved film gate of claim 1, further comprising an exit guide roller mounted to said housing for receiving the film from said exit sprocket and guiding the film to film receiving means on the telecine, said exit roller having a central recessed portion of a width substantially the same as the film, and outer guide portions adjacent said recessed portion.

7. The improved film gate of claim 1, further comprising floating guide means mounted to said housing for supporting and steadily guiding at least one edge of the film as it moves past the film aperture.

8. The improved film gate of claim 7, wherein said floating guide means comprises:
   a fixed first guide and a movable second guide,
   said fixed first guide being affixed to said housing and comprising a horizontal skid rail for slidably supporting the film edge, and a vertical rail for contacting one edge of the film,
   said moveable second guide comprising a horizontal skid rail for slidably supporting the film edge, and a vertical rail for contacting the opposite edge of the film; and
   means for biasing said moveable second guide against its respective film edge.

9. The improved film gate of claim 8, wherein said fixed first guide and said movable second guide are substantially L-shaped in cross-section.

10. The improved film gate of claim 8, wherein said biasing means comprises at least one spring for biasing said moveable second guide inwardly toward the frame aperture. z 11. The improved film gate of claim 1, wherein said housing is mounted to the telecine with said frame aperture being disposed on the top of said housing in a substantially horizontal configuration.

12. The improved film gate of claim 11, wherein the film passes over said frame aperture along a horizontal planar pathway,
   said entry sprocket is mounted to said housing such that the film contacts with a circumferential portion of said first film stabilizing means, and exits said first film stabilizing means at a tangent to said first film stabilizing means and onto said planar pathway,
   said second film stabilizing means is mounted to said housing such that the film exits said planar pathway, contacts with said second film stabilizing means tangentially to said second film stabilizing means, and thence contacts with a circumferential portion of said second film stabilizing means, and both said first film stabilizing means and said second film stabilizing means are mounted beneath the plane of said planar pathway.

13. The improved film gate of claim 1, wherein said entry sprocket and said exit sprocket comprise free rolling sprockets, and wherein the dimensions of said sprockets conform to ANSI standards for motion picture safety film, with Bell & Howell (B&H) perforations and Kodak rounded (KR) corners.

14. The improved film gate of claim 13, wherein the dimensions of the teeth of said sprockets are maintained within a tolerance of ±10 microns relative to predetermined standards for the film sprocket holes.

15. The improved film gate of claim 13, wherein said sprockets are mounted to said housing with means for preventing axial movement of said sprockets.

16. The improved film gate of claim 15, wherein said sprockets are rotatably supported by axles, and wherein said axial movement preventing means comprises:

the longitudinal dimension of said sprockets including its respective axles being manufactured within a predetermined longitudinal tolerance;

a sprocket well defined in said housing for receiving and supporting said sprockets and having a longitudinal dimension the same as the overall longitudinal dimension of said precision sprocket including its respective axles, within said predetermined longitudinal tolerance; and precision roller bearings for supporting said sprocket axles for rotation within said sprocket wells.

17. The improved film gate of claim 16, wherein said predetermined longitudinal tolerance is less than 0.0005 inches.

18. An improved continuous motion film gate for a motion picture telecine, comprising:

a housing for supporting and transporting a film in continuous motion past a scanning means on the telecine, said housing including a frame aperture operative for receiving light from a light source that passes through the film and directing the light to the telecine scanning means;

an entry guide roller mounted to said housing for receiving the film from a feed spool, said entry roller having a central recessed portion of a width substantially the same as the film, and outer guide portions adjacent said recessed portion;

a precision milled entry sprocket positioned adjacent to said frame aperture for guiding the film across said frame aperture, said entry sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes;

a precision milled exit sprocket positioned adjacent to said frame aperture for receiving the film after passing across said frame aperture, said exit sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes; and an exit guide roller mounted to said housing for receiving the film from said exit sprocket and guiding the film to film receiving means on the telecine, said exit roller having a central recessed portion of a width substantially the same as the film, and outer guide portions adjacent said recessed portion.

19. The improved film gate of claim 18, further comprising floating guide means mounted to said housing for supporting and steadily guiding at least one edge of the film as it moves past the film aperture.

20. The improved film gate of claim 19, wherein said floating guide means comprises:

a fixed first guide and a movable second guide, said fixed first guide being affixed to said housing and comprising a horizontal skid rail for slidably supporting the film edge, and a vertical rail for contacting one edge of the film, said moveable second guide comprising a horizontal skid rail for slidably supporting the film edge, and a vertical rail for contacting the opposite edge of the film; and means for biasing said moveable second guide against its respective film edge.

21. The improved film gate of claim 20, wherein said fixed first guide and said movable second guide are substantially L-shaped in cross-section.

22. The improved film gate of claim 20, wherein said biasing means comprises at least one spring for biasing said moveable second guide inwardly toward the frame aperture.

23. The improved film gate of claim 18, wherein the film passes over said frame aperture along a horizontal planar pathway, said entry sprocket is mounted to said housing such that the film contacts with a circumferential portion of said entry sprocket, and exits said entry sprocket at a tangent to said entry sprocket and onto said planar pathway, said exit sprocket is mounted to said housing such that the film exits said planar pathway, contacts with said exit sprocket tangentially to said exit sprocket, and thence contacts with a circumferential portion of said exit sprocket, and both said entry sprocket and said exit sprocket are mounted beneath the plane of said planar pathway.

24. The improved film gate of claim 18, wherein the dimensions of said entry guide roller, said entry sprocket, said exit sprocket, and said exit guide roller conform to ANSI standards for motion picture safety film, with Bell & Howell (B&H) perforations and Kodak rounded (KR) corners.

25. The improved film gate of claim 18, wherein the dimensions of the teeth of said entry sprocket and said exit sprocket are maintained within a tolerance of ±10 microns relative to predetermined standards for the film sprocket holes.

26. An improved continuous motion film gate for a motion picture telecine, comprising:

a housing for supporting and transporting a film in continuous motion along a horizontal planar pathway past a scanning means on the telecine, said housing including a frame aperture operative for receiving light from a light source that passes through the film and directing the light to the telecine scanning means;

an entry guide roller mounted to said housing for receiving the film from a feed spool, said entry roller having a central recessed portion of a width substantially the same as the film, and outer guide portions adjacent said recessed portion;

a precision milled entry sprocket positioned adjacent to said frame aperture for guiding the film across said frame aperture, said entry sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes, said entry sprocket being mounted to said housing beneath the plane of said planar pathway such that the film contacts with a circumferential portion of said entry sprocket, and exits said entry sprocket at a tangent to said entry sprocket and onto said planar pathway, a precision milled exit sprocket positioned adjacent to said frame aperture for receiving the film after passing across said frame aperture, said exit sprocket including a ring of first sprocket teeth and a ring of second sprocket teeth, said first sprocket teeth being sized and shaped substantially in accordance with both the lateral and longitudinal dimensional specifications for the film sprocket holes, said second sprocket teeth being sized and shaped substantially in accordance with the longitudinal dimensional specifications for the film sprocket holes, said exit sprocket being mounted to said housing beneath the plane of said planar pathway such that the film exits said planar pathway, contacts with said exit sprocket tangentially to said exit sprocket, and thence contacts with a circumferential portion of said exit sprocket;

an exit guide roller mounted to said housing for receiving the film from said exit sprocket and guiding the film to film receiving means on the telecine, said exit roller having a central recessed portion of a width substantially the same as the film, and outer guide portions adjacent said recessed portion; a fixed first guide and a movable second guide mounted to said housing for supporting and steadily guiding at least one edge of the film as it moves past the film aperture, said fixed first guide being affixed to said housing and comprising a horizontal skid rail for slidably supporting the film edge, and a vertical rail for contacting one edge of the film, said moveable second guide comprising a horizontal skid rail for slidably supporting the film edge, and a vertical rail for contacting the opposite edge of the film; and means for biasing said moveable second guide against its respective film edge.

27. The improved film gate of claim 26, wherein said fixed first guide and said movable second guide are substantially L-shaped in cross-section.

28. The improved film gate of claim 26, wherein said biasing means comprises at least one spring for biasing said moveable second guide inwardly toward the frame aperture.

29. The improved film gate of claim 26, wherein the dimensions of said entry guide roller, said entry sprocket, said exit sprocket, and said exit guide roller conform to ANSI standards for motion picture safety film, with Bell & Howell (B&H) perforations and Kodak rounded (KR) corners.

30. The improved film gate of claim 26, wherein the dimensions of the teeth of said entry sprocket and said exit sprocket are maintained within a tolerance of ±10 microns relative to predetermined standards for the film sprocket holes.

* * * * *